(12) United States Patent
Denifl et al.

(10) Patent No.: US 12,691,623 B2
(45) Date of Patent: Jul. 28, 2026

(54) MECHANICAL POLYOLEFIN RECYCLING PROCESS

(71) Applicant: BOREALIS AG, Vienna (AT)

(72) Inventors: Peter Denifl, Linz (AT); Kilian Piettre, Linz (AT); Christian Goetzloff, Linz (AT); Michael Hettrich-Keller, Linz (AT); Doris Machl, Linz (AT); Sameer Vijay, Linz (AT); Hans-Jürgen Priesters, Schleiden-Wintzen (DE); Oliver Lambertz, Roesrath (DE)

(73) Assignee: BOREALIS AG, Vienna (AT)

( * ) Notice: Subject to any disclaimer, the term of this patent is extended or adjusted under 35 U.S.C. 154(b) by 0 days.

(21) Appl. No.: 18/846,823

(22) PCT Filed: Mar. 20, 2023

(86) PCT No.: PCT/EP2023/056995
§ 371 (c)(1),
(2) Date: Sep. 13, 2024

(87) PCT Pub. No.: WO2023/180222
PCT Pub. Date: Sep. 28, 2023

(65) Prior Publication Data
US 2025/0187245 A1      Jun. 12, 2025

(30) Foreign Application Priority Data
Mar. 22, 2022    (EP) ..................................... 22163635

(51) Int. Cl.
B29C 48/00      (2019.01)
B29B 17/02      (2006.01)
(Continued)

(52) U.S. Cl.
CPC ............ B29C 48/022 (2019.02); B29B 17/02 (2013.01); B29B 17/0412 (2013.01); C08J 11/08 (2013.01);
(Continued)

(58) Field of Classification Search
CPC ........ B29B 2017/0203; B29K 2015/26; B29K 2023/06; B29K 2023/12; C08J 2323/06; C08J 2323/12
See application file for complete search history.

(56) References Cited

U.S. PATENT DOCUMENTS 4,728,045 A      3/1988  Tomaszek
6,114,401 A      9/2000  Doonan
(Continued)

FOREIGN PATENT DOCUMENTS

CN          100482439 C      8/2005
DE          19753386 A1      6/1999
(Continued)

OTHER PUBLICATIONS

Office Action with English translation for Japanese Patent Application No. 2024-554766 dated Sep. 24, 2025, 10 pages.
(Continued)

*Primary Examiner* — Yung-Shen M Tsui
(74) *Attorney, Agent, or Firm* — Lowenstein Sandler LLP

(57)           ABSTRACT
A mechanical polyolefin recycling process, comprising a particular combination of processing steps in a given order, providing access to highly pure recycled polyolefin grades, having well balanced mechanical and optical properties that are superior to those typically seen in similar recycled polyolefin grades and a mechanical polyolefin recycling apparatus configured for carrying out the mechanical polyolefin recycling process.

19 Claims, 1 Drawing Sheet

Preferred configuration of optical sorters in step c)

(51) Int. Cl.

| | |
|---|---|
| *B29B 17/04* | (2006.01) |
| *C08J 11/08* | (2006.01) |
| *B29B 17/00* | (2006.01) |
| *B29K 23/00* | (2006.01) |
| *B29K 105/26* | (2006.01) |

(52) U.S. Cl.
CPC ................ *B29B 2017/0015* (2013.01); *B29B 2017/0203* (2013.01); *B29B 2017/0224* (2013.01); *B29B 2017/0279* (2013.01); *B29B 2017/0468* (2013.01); *B29K 2023/06* (2013.01); *B29K 2023/12* (2013.01); *B29K 2105/26* (2013.01); *C08J 2323/06* (2013.01); *C08J 2323/12* (2013.01)

(56) References Cited

U.S. PATENT DOCUMENTS

| | | | |
|---|---|---|---|
| 6,770,680 B2 | 8/2004 | Klenk | |
| 6,845,869 B1 | 1/2005 | Graf von Deym | |
| 10,105,908 B2 | 10/2018 | Bergman et al. | |
| 2006/0001187 A1* | 1/2006 | Allen, III | B29B 17/02 |
| | | | 264/911 |
| 2007/0228600 A1 | 10/2007 | Bohnert | |
| 2014/0054204 A1 | 2/2014 | Christel | |
| 2017/0058094 A1* | 3/2017 | Frenkel | B29B 7/46 |
| 2019/0193303 A1* | 6/2019 | Heyde | B29B 17/02 |
| 2023/0234263 A1 | 7/2023 | Sente et al. | |
| 2024/0262012 A1* | 8/2024 | Tran | B29B 17/02 |

FOREIGN PATENT DOCUMENTS

| | | | |
|---|---|---|---|
| DE | 102016116742 A1 | 3/2018 | |
| EP | 0578727 A1 | 1/1994 | |
| EP | 1052021 A1 | 11/2000 | |
| EP | 2700456 A1 | 2/2014 | |
| EP | 2823945 A2 * | 1/2015 | ............ B07C 5/342 |
| FR | 2751261 A1 | 1/1998 | |
| GB | 2465839 A | 6/2010 | |
| JP | 2015021109 A | 2/2015 | |
| JP | 2015030150 A | 2/2015 | |
| TW | 1616463 B | 3/2018 | |
| WO | 92/16312 A1 | 10/1992 | |
| WO | 9803318 A1 | 1/1998 | |
| WO | 2012139967 A1 | 10/2012 | |
| WO | 2021140087 A1 | 7/2021 | |
| WO | 2021230033 A1 | 11/2021 | |

OTHER PUBLICATIONS

International Search Report and Written Opinion for PCT/EP2023/056995, mailed Nov. 5, 2023.

European Search Report for EP22163635.0 dated Aug. 3, 2022, 15 pages.

Taiwanese Office Action with English Translation for Taiwanese Patent Application No. 112110250 dated Nov. 16, 2023, 25 pages.

Plastic Additives Handbook, pp. 871 to 873, 5th edition, 2001 of Hans Zweifel.

Kosier et al, "Food grade decontamination trials of household PP waste", Wrap Project IMT003-101, Jul. 1, 2012; URL: http://www.wrap.org.uk/sites/files/wra p/Phase%203%20Food%20Grade%20rPP%20decontamination%20final%20report.pdf.

Frank Welle: "Develop a food grade HDPE recycling process", Jun. 4, 2005 (Jun. 4, 2005), XP055585397, URL:http://www.wrap.org.uk/sites/files/wra p/Full%20wrap_HDPE_Recycling_final_reportV141205.pdf.

Office Action with English translation for Japanese Patent Application No. 2024-554766, dated May 12, 2026, 4 pages.

* cited by examiner

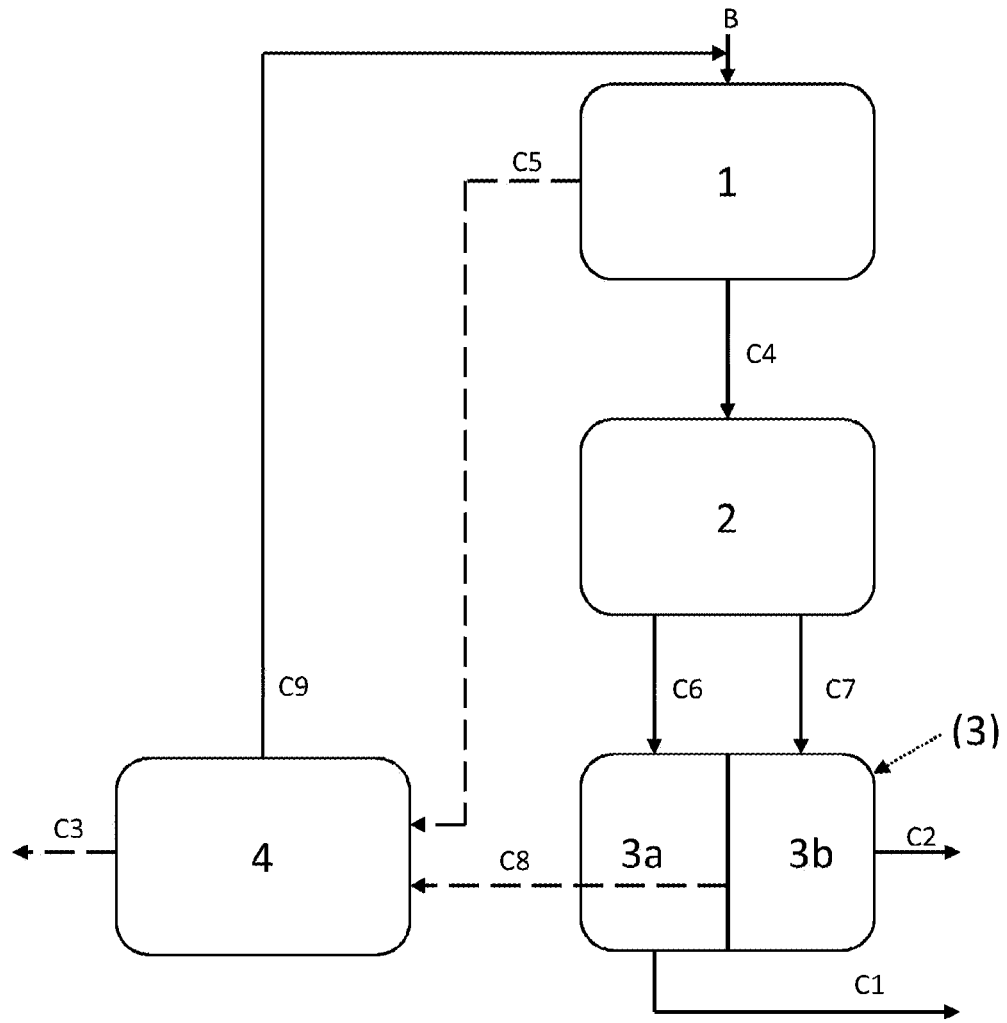
Preferred configuration of optical sorters in step c)

MECHANICAL POLYOLEFIN RECYCLING PROCESS

CROSS-REFERENCE TO RELATED APPLICATION(S)

The present application is a national stage entry under 35 U.S.C. § 371 of International Application No. PCT/EP2023/056995, filed on Mar. 20, 2023, which claims priority to European (EP) patent application Ser. No. 22/163,635.0, filed on Mar. 22, 2022. The contents of these applications are hereby incorporated by reference in their entirety.

FIELD OF THE INVENTION

The present invention relates to a mechanical polyolefin recycling process, comprising a particular combination of processing steps in a given order, providing access to highly pure recycled polyolefin grades, having well balanced mechanical and optical properties that are superior to those typically seen in similar recycled polyolefin grades and a mechanical polyolefin recycling apparatus configured for carrying out the mechanical polyolefin recycling process.

BACKGROUND TO THE INVENTION

During the last decade, concern about plastics and the environmental sustainability of their use in current quantities has grown. This has led to new legislation on disposal, collection and recycling of polyolefins. There have additionally been efforts in a number of countries to increase the percentage of plastic materials being recycled instead of being sent to landfill.

In Europe, plastic waste accounts for approximately 27 million tons of waste a year; of this amount in 2016, 7.4 million tons were disposed of in landfill, 11.27 million tons were burnt (in order to produce energy) and around 8.5 million tons were recycled. Polypropylene based materials are a particular problem as these materials are extensively used in packaging. Taking into account the huge amount of waste collected compared to the amount of waste recycled back into the stream (amounting to only about 30%), there is still a great potential for intelligent reuse of plastic waste streams and for mechanical recycling of plastic wastes.

Taking the automobile industry as an example. In Europe the end of life (ELV) directive from the EU states, that 85%/95% of materials from vehicles should be recyclable or recoverable. The present rate of recycling of automobile components is significantly below this target. On average vehicles consist of 9 wt.-% plastics, out of this 9 wt.-% only 3 wt.-% is currently recycled. Therefore, there is still a need to be met if targets for recycling plastics in the automobile industry are to be achieved. This invention particularly focuses on mechanically recycled waste streams as opposed to "energetic recycling" where polyolefins are burnt and used for energy. However, due to cost reasons, poor mechanical properties and inferior processing properties waste streams containing cross-linked polyolefins are often used for energy recovery (e.g. incineration in a district heating plant or for heat generation in the cement industry) and are less often recycled into new products.

One major trend in the field of polyolefins is the use of recycled materials that are derived from a wide variety of sources. Durable goods streams such as those derived from waste electrical equipment (WEE) or end-of-life vehicles (ELV) contain a wide variety of plastics. These materials can be processed to recover acrylonitrile-butadiene-styrene (ABS), high impact polystyrene (HIPS), polypropylene (PP) and polyethylene (PE) plastics. Separation can be carried out using density separation in water and then further separation based on fluorescence, near infrared absorption or Raman fluorescence. However, it is commonly quite difficult to obtain either pure recycled polypropylene or pure recycled polyethylene. Generally, recycled quantities of polypropylene on the market are mixtures of both polypropylene (PP) and polyethylene (PE); this is especially true for post-consumer waste streams. Commercial recyclates from post-consumer waste sources have been found generally to contain mixtures of PP and PE, the minor component reaching up to <50 wt.-%.

The better the quality, i.e. the higher the purity, of the recycled polyolefin the more expensive the material is. Moreover, recycled polyolefin materials are often cross-contaminated with non-polyolefin materials, such as polyethylene terephthalate, polyamide, polystyrene or non-polymeric substances like wood, paper, glass or aluminium.

In addition, recycled polyolefin rich materials, for example polypropylene rich materials, normally have properties that are much worse than those of the virgin materials are, unless the amount of recycled polyolefin added to the final compound is extremely low. For example, such materials often have poor performance in odour and taste, limited stiffness, limited impact strength and poor mechanical properties (such as e.g. brittleness) thus, they do not fulfil customer requirements.

SUMMARY OF THE INVENTION

The present invention is based on the observation that a particular combination of processing steps in a given order provides access to highly pure recycled polyolefin grades, having well balanced mechanical and optical properties that are superior to those typically seen in similar recycled polyolefin grades. Furthermore, the particular combination of steps means that quality of the highly pure recycled polyolefin grades is less dependent on the quality of the feedstock material, which is known to vary significantly, depending on the source of the feedstock material.

Thus, in a first aspect, the present invention is directed to a mechanical polyolefin recycling process, comprising, in the given order, the steps of:
- a) providing a precursor mixed plastic recycling stream (A);
- b) sieving the precursor mixed plastic recycling stream (A) to create a sieved mixed plastic recycling stream (B) having only articles with a longest dimension in the range from 30 to 400 mm;
- c) sorting the sieved mixed plastic recycling stream (B) by means of one or more optical sorters wherein the sieved mixed plastic recycling stream (B) is at least sorted by colour and optionally also by polyolefin type and/or article form, thereby generating one or more single-colour sorted polyolefin recycling stream(s) (C) and a mixed-colour sorted polyolefin recycling stream (CM), wherein each of the one or more single-colour sorted polyolefin recycling stream(s) (C) and the mixed-colour sorted polyolefin recycling stream (CM) are subjected separately to steps d) and beyond;
- d) reducing the size of the pieces of the sorted polyolefin recycling stream (C or CM) to form a flaked polyolefin recycling stream (D);
- e) washing the flaked polyolefin recycling stream (D) with a first aqueous washing solution (W1) without the input of thermal energy, thereby generating a first suspended polyolefin recycling stream (E);

f) removing at least part of the first aqueous washing solution (W1), preferably substantially all of the first aqueous washing solution (W1), from the first suspended polyolefin recycling stream (E) to obtain a first washed polyolefin recycling stream (F);

g) washing the first washed polyolefin recycling stream (F) with a second aqueous washing solution (W2) thereby generating a second suspended polyolefin recycling stream (G), wherein sufficient thermal energy is introduced to the second suspended polyolefin recycling stream (G) to provide a temperature in the range from 65 to 95° C. during the washing;

h) removing the second aqueous washing solution (W2) and any material not floating on the surface of the second aqueous washing solution from the second suspended polyolefin recycling stream (G) to obtain a second washed polyolefin recycling stream (H);

i) drying the second washed polyolefin recycling stream (H), thereby obtaining a dried polyolefin recycling stream (I);

j) optionally separating the dried polyolefin recycling stream (I) into a light fraction and a heavy fraction polyolefin recycling stream (J);

k) further sorting the heavy fraction polyolefin recycling stream (J) or, in the case that step j) is absent, the dried polyolefin recycling stream (I) by means of one or more optical sorters sorting for one or more target polyolefins by removing any flakes containing material other than the one or more target polyolefins, yielding a purified polyolefin recycling stream (K);

l) optionally melt extruding, preferably pelletizing, the purified polyolefin recycling stream (K), preferably wherein additives (Ad) are added in the melt state, to form an extruded, preferably pelletized, recycled polyolefin product (L); and m) optionally aerating the recycled polyolefin product (L) or, in the case that step l) is absent, the purified polyolefin recycling stream (K) to remove volatile organic compounds, thereby generating an aerated recycled polyolefin product (M), being either an aerated extruded, preferably pelletized, recycled polyolefin product (M1) or aerated recycled polyolefin flakes (M2), wherein the order of steps l) and m) can be interchanged, such that the purified polyolefin recycling stream (K) is first aerated to form aerated recycled polyolefin flakes (M2) that are subsequently extruded, preferably wherein additives (Ad) are added in the melt state, to form an extruded, preferably pelletized, aerated recycled polyolefin product (M3).

In a further aspect, the present invention is directed to a mechanical polyolefin recycling apparatus configured for carrying out the mechanical polyolefin recycling process according to any one of the preceding claims.

DEFINITIONS

Post-consumer waste refers to objects having completed at least a first use cycle (or life cycle), i.e. having already served their first purpose; while industrial waste refers to manufacturing scrap, which does not normally reach a consumer.

Recycling streams may contain both articles for recycling and fragments of articles for recycling, for example flakes. In the context of the present invention, the content of the recycling streams will be referred to as pieces, irrespective of whether these pieces are whole articles, fragments thereof, or flakes thereof. In certain embodiments, the pieces may be flakes, whereas in other embodiments pieces may be larger objects that may be converted into flakes at a later stage.

In the context of the present invention, a mixed plastic recycling stream may be any stream suitable for recycling, wherein polyolefin is present and the stream does not only contain a single polyolefin product, as would be the case, for example, for certain post-industrial waste recycling streams wherein the production waste of a single polyolefin grade, or a single polyolefin-containing article may be the only piece present in the stream. Generally speaking, all polyolefin-containing post-consumer waste recycling streams will be mixed plastic recycling streams, as will many polyolefin-containing post-industrial waste recycling streams.

The term "article form", as used herein, refers to the shape and form of articles present in a polyolefin recycling stream. Such articles may be present, inter alia, in the form of films, bags, and pouches, which may be considered as flexible articles, and, inter alia, in the form of moulded articles such as food containers, skin-care product containers, and plastic bottles, which may be considered as rigid articles. Commercial optical sorters, such as Tomra Autosort, RTT Steinert Unisort, and Redwave Pellenc, are able to separate so-called rigid articles from so-called flexible articles via their aerodynamic properties (i.e. a stream of gas is typically applied to the stream and those articles being rigid articles will fall with a different arc than flexible articles), converting streams containing such articles into so-called rigid streams and flex streams.

According to the present invention, one or more single-colour sorted polyolefin stream(s) (C) is/are obtained as an intermediate product, as a result of a sorting process wherein the polyolefin-containing articles are at least sorted by their colour. The person skilled in the art would be aware that a considerable amount of polyolefin-containing articles in any given mixed-colour recycling stream would be transparent, i.e. colourless. For the purposes of the present invention, any transparent, i.e. colourless, polyolefin-containing articles are considered to be a separate colour classification, resulting in a single-colour sorted polyolefin stream (C) wherein the 'colour' is colourless (i.e. transparent). In some embodiments, this colourless polyolefin recycling stream undergoes the subsequent steps of the method resulting in a colourless recycled product or, in other embodiments, the colourless polyolefin recycling stream is mixed with a non-colourless single colour recycling stream (e.g. a white polyolefin recycling stream) with the mixed stream considered to be a single-colour recycling stream of the non-colourless colour (i.e. a mixture of a colourless stream with a white stream would thereafter be considered as a white stream). Whilst not wishing to be bound by theory, it is believed that the addition of colourless polyolefin to non-colourless polyolefin recycling streams does not notably influence the final colour of the recycled product.

According to the present invention, it is essential that the one or more single-colour sorted recycling stream(s) (C) and the mixed-colour sorted polyolefin recycling stream (CM) are both exposed to the later processing steps d) through m). In the context of the present invention, the term "single-colour" is to be interpreted as meaning substantially the same colour, i.e. a polyolefin stream containing pieces of various shades of red would be classed as a single-colour stream, whereas a polyolefin stream containing yellow pieces as well as red pieces would not be classed as a single-colour stream. The precision with which a single colour may be selected is dependent on the techniques used to sort by colour, and is thus limited by the available technology. Since the impression of colour on the human eye cannot be strictly defined by wavelength, given that the same colour may be achieved with a single wavelength of light and a combination of different wavelengths, definition on the CIELAB colour scale is the most suitable descriptor. It is particularly preferred that same-colour means that the ΔE<50, preferably ΔE<40, more preferably ΔE<30 and most preferably. ΔE is defined by the formula below:

$$\Delta E_{ab}^{*} = \sqrt{(L_2^{*} - L_1^{*})^2 + (a_2^{*} - a_1^{*})^2 + (b_2^{*} - b_1^{*})^2}$$

in which $$(L_2^{*} - L_1^{*})$$

represents difference in lightness between the sample and a predefined colour, $$(a_2^{*} - a_1^{*})$$

represents the difference in redness or greyness between the sample and the predefined colour, and $$(b_2^{*} - b_1^{*})$$

represents blueness-yellowness differences between the sample and the predefined colour.

Furthermore, the skilled person would be aware that state of the art sorting processes, such as those involving automated sorters of the type discussed below, do not result in perfect sorting, meaning that any wording such as "wherein the stream contains only a single colour" or "wherein the stream contains only a single polyolefin type" are to be interpreted broadly, wherein the streams thus described contain substantially only the stated colour or polyolefin type, but are not 100% pure due to technical limitations of the sorting steps.

That said, the skilled person would be aware that sorting with an optical sorter, i.e. an automated sorter of the type discussed below, would nonetheless result in a considerably more accurate sorting than so-called "rough sorting", wherein the articles are separated by simple visual inspection and assigned to the colour fraction corresponding to their main colour. The results of such a "rough sorting" would not constitute a single-colour polyolefin stream within the meaning of the present invention.

Likewise, a mixed-colour sorted polyolefin recycling stream (CM) obtained via such a sorting process would be necessarily deficient in one or more colours, thus is not equivalent to a mixed-colour polyolefin recycling stream that has not undergone one or more sorting steps.

The person skilled in the art would be aware that pH values of greater than 14.0 and lower than 0.0 are theoretically possible; however, they would also be aware that the determination of such pH values is incredibly difficult using conventional pH probes. As such, in the context of this invention, aqueous solutions having an effective pH of greater than 14.0 are considered to have a pH of 14.0 and aqueous solutions having an effective pH of lower than 0.0 are considered to have a pH of 0.0.

In the context of the present invention, the term "rinse" is used to indicate the addition of a solvent, typically water, which is used to remove foreign material or remaining liquid from the surface of the polyolefin. This can be achieved in very short times, i.e. less than 5 minutes, often less than 1 minute, in contrast to "washing" steps that typically require a longer time, and agitation, to remove adherent foreign material from the surface of the polyolefin and potentially extract volatile organic compounds from the polyolefin.

Where the term "comprising" is used in the present description and claims, it does not exclude other non-specified elements of major or minor functional importance. For the purposes of the present invention, the term "consisting of" is considered to be a preferred embodiment of the term "comprising of". If hereinafter a group is defined to comprise at least a certain number of elements, this is also to be understood to disclose a group, which preferably consists only of these elements.

Where an indefinite or definite article is used when referring to a singular noun, e.g. "a" "an" or "the", this includes a plural of that noun unless something else is specifically stated.

DETAILED DESCRIPTION

The present invention is directed to a mechanical polyolefin recycling process, comprising, in the given order, the steps of:
- a) providing a precursor mixed plastic recycling stream (A);
- b) sieving the precursor mixed plastic recycling stream (A) to create a sieved mixed plastic recycling stream (B) having only articles with a longest dimension in the range from 30 to 400 mm;
- c) sorting the sieved mixed plastic recycling stream (B) by means of one or more optical sorters wherein the sieved mixed plastic recycling stream (B) is at least sorted by colour and optionally also by polyolefin type and/or article form, thereby generating one or more single-colour sorted polyolefin recycling stream(s) (C) and a mixed-colour sorted polyolefin recycling stream (CM), wherein each of the one or more single-colour sorted polyolefin recycling stream(s) (C) and the mixed-colour sorted polyolefin recycling stream (CM) are subjected separately to steps d) and beyond;
- d) reducing the size of the pieces of the sorted polyolefin recycling stream (C or CM) to form a flaked polyolefin recycling stream (D);
- e) washing the flaked polyolefin recycling stream (D) with a first aqueous washing solution (W1) without the input of thermal energy, thereby generating a first suspended polyolefin recycling stream (E);
- f) removing at least part of the first aqueous washing solution (W1), preferably substantially all of the first aqueous washing solution (W1) from the first suspended polyolefin recycling stream (E) to obtain a first washed polyolefin recycling stream (F);
- g) washing the first washed polyolefin recycling stream (F) with a second aqueous washing solution (W2) thereby generating a second suspended polyolefin recycling stream (G), wherein sufficient thermal energy is introduced to the second suspended polyolefin recycling stream (G) to provide a temperature in the range from 65 to 95° C. during the washing;

h) removing the second aqueous washing solution (W2) and any material not floating on the surface of the second aqueous washing solution from the second suspended polyolefin recycling stream (G) to obtain a second washed polyolefin recycling stream (H);

i) drying the second washed polyolefin recycling stream (H), thereby obtaining a dried polyolefin recycling stream (I);

j) optionally separating the dried polyolefin recycling stream (I) into a light fraction and a heavy fraction polyolefin recycling stream (J);

k) further sorting the heavy fraction polyolefin recycling stream (J) or, in the case that step j) is absent, the dried polyolefin recycling stream (I) by means of one or more optical sorters sorting for one or more target polyolefins by removing any flakes containing material other than the one or more target polyolefins, yielding a purified polyolefin recycling stream (K);

l) optionally melt extruding, preferably pelletizing, the purified polyolefin recycling stream (K), preferably wherein additives (Ad) are added in the melt state, to form an extruded, preferably pelletized, recycled polyolefin product (L); and m) optionally aerating the recycled polyolefin product (L) or, in the case that step l) is absent, the purified polyolefin recycling stream (K) to remove volatile organic compounds, thereby generating an aerated recycled polyolefin product (M), being either an aerated extruded, preferably pelletized, recycled polyolefin product (M1) or aerated recycled polyolefin flakes (M2), wherein the order of steps l) and m) can be interchanged, such that the purified polyolefin recycling stream (K) is first aerated to form aerated recycled polyolefin flakes (M2) that are subsequently extruded, preferably wherein additives (Ad) are added in the melt state, to form an extruded, preferably pelletized, aerated recycled polyolefin product (M3).

In one embodiment, the steps i) and onward comprise, in the given order, the steps of i) drying the second washed polyolefin recycling stream (H), thereby obtaining a dried polyolefin recycling stream (I); and k) further sorting the dried polyolefin recycling stream (I) by means of one or more optical sorters sorting for one or more target polyolefins by removing any flakes containing material other than the one or more target polyolefins, yielding a purified polyolefin recycling stream (K).

In another embodiment, the steps i) and onward comprise, in the given order, the steps of i) drying the second washed polyolefin recycling stream (H), thereby obtaining a dried polyolefin recycling stream (I);

j) separating the dried polyolefin recycling stream (I) into a light fraction and a heavy fraction polyolefin recycling stream (J); and k) further sorting the heavy fraction polyolefin recycling stream (J) by means of one or more optical sorters sorting for one or more target polyolefins by removing any flakes containing material other than the one or more target polyolefins, yielding a purified polyolefin recycling stream (K).

In a further embodiment, the steps i) and onward comprise, in the given order, the steps of j) drying the second washed polyolefin recycling stream (H), thereby obtaining a dried polyolefin recycling stream (I);

k) further sorting the dried polyolefin recycling stream (I) by means of one or more optical sorters sorting for one or more target polyolefins by removing any flakes containing material other than the one or more target polyolefins, yielding a purified polyolefin recycling stream (K); and l) melt extruding, preferably pelletizing, the purified polyolefin recycling stream (K), preferably wherein additives (Ad) are added in the melt state, to form an extruded, preferably pelletized, recycled polyolefin product (L).

In yet another embodiment, the steps i) and onward comprise, in the given order, the steps of i) drying the second washed polyolefin recycling stream (H), thereby obtaining a dried polyolefin recycling stream (I);

j) separating the dried polyolefin recycling stream (I) into a light fraction and a heavy fraction polyolefin recycling stream (J);

k) further sorting the heavy fraction polyolefin recycling stream (J) by means of one or more optical sorters sorting for one or more target polyolefins by removing any flakes containing material other than the one or more target polyolefins, yielding a purified polyolefin recycling stream (K); and l) melt extruding, preferably pelletizing, the purified polyolefin recycling stream (K), preferably wherein additives (Ad) are added in the melt state, to form an extruded, preferably pelletized, recycled polyolefin product (L).

In yet a further embodiment, the steps i) and onward comprise, in the given order, the steps of i) drying the second washed polyolefin recycling stream (H), thereby obtaining a dried polyolefin recycling stream (I);

k) further sorting the dried polyolefin recycling stream (I) by means of one or more optical sorters sorting for one or more target polyolefins by removing any flakes containing material other than the one or more target polyolefins, yielding a purified polyolefin recycling stream (K); and m) aerating the purified polyolefin recycling stream (K) to remove volatile organic compounds, thereby generating aerated recycled polyolefin flakes (M2).

In another embodiment, the steps i) and onward comprise, in the given order, the steps of:

i) drying the second washed polyolefin recycling stream (H), thereby obtaining a dried polyolefin recycling stream (I);

j) separating the dried polyolefin recycling stream (I) into a light fraction and a heavy fraction polyolefin recycling stream (J); and k) further sorting the heavy fraction polyolefin recycling stream (J) by means of one or more optical sorters sorting for one or more target polyolefins by removing any flakes containing material other than the one or more target polyolefins, yielding a purified polyolefin recycling stream (K); and m) aerating the purified polyolefin recycling stream (K) to remove volatile organic compounds, thereby generating aerated recycled polyolefin flakes (M2).

In a further embodiment, the steps i) and onward comprise, in the given order, the steps of:

i) drying the second washed polyolefin recycling stream (H), thereby obtaining a dried polyolefin recycling stream (I); and k) further sorting the dried polyolefin recycling stream (I) by means of one or more optical sorters sorting for one or more target polyolefins by removing any flakes containing material other than the one or more target polyolefins, yielding a purified polyolefin recycling stream (K);

l) melt extruding, preferably pelletizing, the purified polyolefin recycling stream (K), preferably wherein additives (Ad) are added in the melt state, to form an extruded, preferably pelletized, recycled polyolefin product (L); and m) aerating the recycled polyolefin product (L) to remove volatile organic compounds, thereby generating an aerated extruded, preferably pelletized, recycled polyolefin product (M1).

In yet another embodiment, the steps i) and onward comprise, in the given order, the steps of:

i) drying the second washed polyolefin recycling stream (H), thereby obtaining a dried polyolefin recycling stream (I);

j) separating the dried polyolefin recycling stream (I) into a light fraction and a heavy fraction polyolefin recycling stream (J); and k) further sorting the heavy fraction polyolefin recycling stream (J) by means of one or more optical sorters sorting for one or more target polyolefins by removing any flakes containing material other than the one or more target polyolefins, yielding a purified polyolefin recycling stream (K);

l) melt extruding, preferably pelletizing, the purified polyolefin recycling stream (K), preferably wherein additives (Ad) are added in the melt state, to form an extruded, preferably pelletized, recycled polyolefin product (L); and m) aerating the recycled polyolefin product (L) to remove volatile organic compounds, thereby generating an aerated extruded, preferably pelletized, recycled polyolefin product (M1).

In yet a further embodiment, the steps i) and onward comprise, in the given order, the steps of:

i) drying the second washed polyolefin recycling stream (H), thereby obtaining a dried polyolefin recycling stream (I); and k) further sorting the dried polyolefin recycling stream (I) by means of one or more optical sorters sorting for one or more target polyolefins by removing any flakes containing material other than the one or more target polyolefins, yielding a purified polyolefin recycling stream (K);

m) aerating the purified polyolefin recycling stream (K) to remove volatile organic compounds, thereby generating aerated recycled polyolefin flakes (M2); and l) melt extruding, preferably pelletizing, the aerated recycled polyolefin flakes (M2), preferably wherein additives (Ad) are added in the melt state, to form an extruded, preferably pelletized, aerated recycled polyolefin product (M3).

In a final embodiment, the steps i) and onward comprise, in the given order, the steps of:

i) drying the second washed polyolefin recycling stream (H), thereby obtaining a dried polyolefin recycling stream (I);

j) separating the dried polyolefin recycling stream (I) into a light fraction and a heavy fraction polyolefin recycling stream (J); and k) further sorting the heavy fraction polyolefin recycling stream (J) by means of one or more optical sorters sorting for one or more target polyolefins by removing any flakes containing material other than the one or more target polyolefins, yielding a purified polyolefin recycling stream (K);

m) aerating the purified polyolefin recycling stream (K) to remove volatile organic compounds, thereby generating aerated recycled polyolefin flakes (M2); and l) melt extruding, preferably pelletizing, the aerated recycled polyolefin flakes (M2), preferably wherein additives (Ad) are added in the melt state, to form an extruded, preferably pelletized, aerated recycled polyolefin product (M3).

Without wishing to be bound by theory, it is believes that conducting step m) before step l) can be advantageous since the improved surface area to volume ratio of the polyolefin flakes means that more volatile organic compounds can be removed, whilst conducting step l) before step m) can be advantageous since extrusion can generate new volatile organic compounds through decomposition of the polyolefin or contaminants (e.g. PVC or PET), or can allow volatile organic compounds that were not near the surface of the flakes to migrate to the surface of the extruded product, thereby increasing the odour. Which embodiment is preferable will differ from process to process and should be optimised accordingly.

Step a) involves the provision of a precursor mixed plastic recycling stream (A).

This precursor mixed plastic recycling stream (A) may originate from post-consumer waste, post-industrial waste or a combination thereof.

Preferably, the precursor mixed plastic recycling stream (A) originates from post-consumer waste.

As the person skilled in the art would be aware, the provision of such precursor mixed plastic recycling streams may involve the collection of suitable polyolefin-containing materials from the post-consumer (e.g. from kerbside recycling bins) or post-industrial source, or alternatively pregathered mixed plastic recycling streams can be purchased from any number of commercial recycling firms.

The form in which the precursor mixed plastic recycling stream (A) is not important; however, what is required is that the articles present in the precursor mixed plastic recycling stream (A) are not stuck together during steps b) to m). A common form that commercial mixed-plastic recycling streams are obtained is in the form of a bale. If the precursor mixed plastic recycling stream (A) is provided in the form of a bale, it will be required to break apart the bale before the precursor mixed plastic recycling stream (A) undergoes the sieving of step b). Depending on which method has been used to pack the bale, it may also be necessary to remove any wires that were used to strap the bale (bale de-wiring) and/or empty the bale from a container, such as a plastic bag or wrapping (bag/bale opening).

Furthermore, it may be necessary to store an intermediate product (i.e. intermediate recycling stream) of the mechanical polyolefin recycling process (such as at least one of the one or more single-colour sorted polyolefin recycling stream(s) (C) or the mixed-colour sorted polyolefin recycling stream (CM)), in which case it is possible to form said intermediate product into a bale. Any bales thus formed would need to be broken apart before the intermediate product undergoes the next step of the process, preferably by using one of the suitable methods listed above. Likewise, an intermediate product (i.e. intermediate recycling stream) may be stored without being formed into bales, for example in a suitable container, in which case the intermediate product can be reintroduced to the next step of the process without any need for breaking apart etc.

The skilled person would understand that processes that involve each of the essential steps of the present mechanical polyolefin recycling process in the given order, but also involve removal of an intermediate product for some length of time, either in the form of a bale or otherwise, and the reintroduction of the stored intermediate product to the mechanical polyolefin recycling process at the position from which it was removed would fall within the scope of the present invention.

Step b) involves sieving the precursor mixed plastic recycling stream (A) to create a sieved mixed plastic recycling stream (B) having only articles with a longest dimension in the range from 30 to 400 mm.

The person skilled in the art would be aware of multiple ways in which the sieving of step b) could be achieved and, as such, this sieving step is not particularly limited. That said, it is preferred that the sieving of step b) is achieved by using one sieve with a sieve diameter of 30 mm and another sieve with a sieve diameter of 400 mm to divide the precursor mixed recycling stream into three streams, an undersized stream of articles having a longest dimension of less than 30 mm, an oversized stream of articles having a longest dimension of greater than 400 mm and the sieved mixed plastic recycling stream (B). The undersized and oversized streams may either be discarded or redirected for use in other mechanical polyolefin recycling processes.

Step c) involves sorting the sieved mixed plastic recycling stream (B) by means of one or more optical sorters wherein the sieved mixed plastic recycling stream (B) is at least sorted by colour and optionally also by polyolefin type and/or article form, thereby generating one or more single-colour sorted polyolefin recycling stream(s) (C) and a mixed-colour sorted polyolefin recycling stream (CM).

In the broadest sense, any optical sorter can be used to achieve the sorting of step c). In the context of the present invention, the term "optical sorter" refers to a sorting unit that uses any form of EM-radiation (visible or non-visible) to differentiate the pieces of the sieved mixed plastic recycling stream (B).

It is preferred that the optical sorters of step c) sort via a method selected from the group consisting of camera systems (operating in the visible range of the EM-spectrum), visible reflectance spectroscopy, near-IR spectroscopic analysis, mid-IR spectroscopic analysis, high-speed laser spectroscopic analysis, Raman spectroscopic analysis, and Fourier-transform infrared (FT-IR) spectroscopic analysis.

Suitable methods for sorting the recycling stream according to colour include camera systems (operating in the visible range of the EM-spectrum) and visible reflectance spectroscopy.

Suitable methods for sorting the recycling stream according to polyolefin type include near-IR spectroscopic analysis, mid-IR spectroscopic analysis, high-speed laser spectroscopic analysis, Raman spectroscopic analysis, Fourier-transform infrared (FT-IR) spectroscopic analysis. Particularly preferred is near-IR spectroscopic analysis.

Suitable methods for sorting the recycling stream according to article type include camera systems (operating in the visible range of the EM-spectrum).

It is preferred that the sorting of step c) sorts according to colour and polyolefin type, meaning that each of the one or more single-colour sorted polyolefin recycling stream(s) (C) is a single colour and all articles contain a single polyolefin.

In some embodiments, a single sensor type (e.g. near-IR sensor or camera system operating in the visible range of the EM spectrum) can be used to distinguish more than one property (e.g. colour and polyolefin type or colour and article form). Furthermore, many near-IR sensor units comprises visible reflectance units or may be configured to measure both the near-IR and visible areas of the EM spectrum, meaning that a single sensor unit may use multiple detection methods.

Multiple detection methods and/or multiple sensors can be employed to achieve the sorting of step c).

It is further preferred that the sorting of step c) sorts according to colour, polyolefin type and article form, meaning that each of the one or more single-colour sorted polyolefin recycling stream(s) (C) is a single colour, all articles contain a single polyolefin and that each stream contains only rigid or flexible articles.

Although the processes of the present invention are suitable for the isolation of any desired polyolefin from a polyolefin mixed recycling stream, the isolation of polyethylene or polypropylene is particularly desirable, since these will most likely be the major polyolefin components of any polyolefin mixed recycling stream, and isolated polyethylene or isolated polypropylene can be fed into pure recycled polyolefin streams or extruded and pelletized along to afford pellets of the desired polyolefin, i.e. of polyethylene or polypropylene.

It is particularly preferred that the single-colour sorted polyolefin recycling stream (C) is either a single-colour sorted polyethylene recycling stream or a single-colour sorted polypropylene recycling stream.

In one embodiment, the mixed-colour sorted polyolefin recycling stream (CM) obtained in step c) is subsequently subjected to a sorting step whereby the sorting step sorts according to polyolefin type, for example selecting only polyethylene pieces or selecting only polypropylene pieces.

In one preferred embodiment, the sorting of step c) sorts the filtered mixed plastic recycling stream (B) into at least a first single-colour sorted polyolefin recycling stream (C1) containing a first target polyolefin (PO1), a second single-colour sorted polyolefin recycling stream (C2) containing a second target polyolefin (PO2) and a mixed-colour sorted polyolefin recycling stream (CM), wherein the first target polyolefin (PO1) and the second polyolefin (PO2) differ in at least one property selected from colour, polyolefin type and article form, wherein the first single-colour sorted polyolefin recycling stream (C1), the second single-colour sorted polyolefin recycling stream (C2), and the mixed-colour sorted polyolefin recycling stream (CM) are individually subjected to steps d) and beyond.

By targeting more than one polyolefin, less of the mixed plastic recycling stream will be sorted into high-purity single-colour sorted polyolefin recycling streams, whilst the mixed-colour sorted polyolefin recycling stream will also be more pure as a result. Furthermore, the efficiency of the process will be improved, since fewer iterations of the sorting process will be necessary per target polyolefin.

If a single-colour sorted polyolefin recycling stream (C) is a colourless sorted polyolefin recycling stream, then this colourless sorted polyolefin recycling stream may be combined with a different single-colour sorted polyolefin recycling stream, e.g. a white sorted polyolefin recycling stream, before being subjected to steps d) and beyond.

In one particular embodiment, a white sorted polyolefin recycling stream and a colourless sorted polyolefin recycling stream are obtained from step c), whilst the mixed-colour polyolefin recycling stream (CM) contains all other colours.

In a particularly preferred embodiment, the sorting of step c) comp comprises the steps of:

c1) sorting the filtered polyolefin recycling stream (B) using a first optical sorter to obtain a fraction (C4) that contains two target polyolefins (PO1 and PO2) and a mixed-colour recycling stream (C5);

c2) sorting the fraction containing two target polyolefins (C4) using a second optical sorter to obtain a first target fraction (C6) containing the first target polyolefin (PO1) and a second target fraction (C7) containing the second target polyolefin (PO2);

c3) further purifying the first target fraction (C6) and the second target fraction (C7) using a third optical sorter, thereby removing any articles not containing the first target polyolefin (PO1) from the first target fraction (C6) and any articles not containing the second target polyolefin (PO2) from the second target fraction (C7), thereby obtaining a first single-colour sorted polyolefin recycling stream (C1) and a second single-colour sorted polyolefin recycling stream (C2), which are individually subjected to steps d) and beyond, and a further mixed-colour recycling stream (C8);

c4) feeding mixed-colour recycling stream (C5) and further mixed-colour recycling stream (C8) into a fourth optical sorter to remove any articles containing the first target polyolefin (PO1) or the second target polyolefin (PO2), thereby generating a reclaimed fraction (C9) and a mixed-colour polyolefin recycling stream (C3); and c5) feeding the reclaimed fraction (C9) back into the first optical sorter during step c1), wherein the mixed-colour polyolefin recycling stream (C3) is either subjected to steps d) and beyond as the mixed-colour sorted polyolefin recycling stream (CM) or subjected to a further iteration of step c), thereby separating the mixed-colour polyolefin recycling stream (C3) into a further first single-colour sorted polyolefin recycling stream (C1), a further second single-colour sorted polyolefin recycling stream (C2), and a further mixed-colour polyolefin recycling stream (C3)

This embodiment may be better understood by reference to FIG. 1.

The labels of FIG. 1 correspond to those of the above-described embodiment, wherein any solid arrows designate recycling streams enroute to one of the one or more single-colour sorted polyolefin recycling streams (C), whilst the dashed streams represent streams enroute to the mixed-colour sorted polyolefin recycling stream (CM).

It is preferred that first target polyolefin (PO1) and the second target polyolefin (PO2) are the same colour but contain different polyolefin types or wherein the first target polyolefin (PO1) and the second target polyolefin (PO2) contain the same polyolefin type but are different colours.

In one particularly preferred embodiment, the first target polyolefin (PO1) is a polypropylene having a first desired colour and the second target polyolefin (PO2) is a polypropylene having a second desired colour different to the first desired colour, or wherein the first target polyolefin (PO1) is a polyethylene having a first desired colour and the second target polyolefin (PO2) is a polyethylene having a second desired colour different to the first desired colour.

It is particularly preferred that first target polyolefin (PO1) and the second target polyolefin (PO2) are the same colour but contain different polyolefin types.

In another particularly preferred embodiment, the first target polyolefin (PO1) is a polypropylene having a desired colour and the second target polyolefin (PO2) is a polyethylene having the same desired colour as the first target polyolefin (PO1).

Alternatively, the first target polyolefin (PO1) and the second target polyolefin (PO2) are the same colour and contain the same polyolefin type but differ in the article form, i.e. if the first target polyolefin (PO1) were a rigid white polyethylene recycling stream, the second target polyolefin (PO2) would be a flexible white polyethylene recycling stream.

In a particularly preferred embodiment, the sorting of step c) involves first sorting the sieved mixed plastic recycling stream (B) by means of one or more optical sorters by polyolefin type, thereby generating a mixed-colour single polyolefin recycling stream (CS), which is subsequently sorted by colour to generate one or more single-colour sorted polyolefin recycling stream(s) (C) and a mixed-colour sorted polyolefin recycling stream (CM), wherein each single-colour sorted polyolefin recycling stream (C) and the mixed-colour sorted polyolefin recycling stream (CM) contain the same polyolefin, preferably selected from polyethylene and polypropylene.

Sorting first for polyolefin type and then by colour ensures that the mixed-colour sorted polyolefin recycling stream (CM) thus obtained contains essentially just the one type of polyolefin, which avoids the need for further sorting steps at a later stage, such as the subsequent sorting step described above.

Each of the preferred embodiments described above and below can be combined, mutatis mutandis, with the present embodiment wherein a polyolefin type-sorting step precedes a colour-sorting step.

For example, step c) may involve first sorting the sieved mixed plastic recycling stream (B) by means of one or more optical sorters by polyolefin type, thereby generating a mixed-colour single polyolefin recycling stream (CS) which is subsequently sorted via the steps c1) to c5) as described above, wherein the first target polyolefin (PO1), the second target polyolefin (PO2) and the mixed-colour polyolefin recycling stream (C3) are the same polyolefin type, preferably selected from polyethylene and polypropylene.

It is particularly preferred that the mixed-colour sorted polyolefin recycling stream (CM) is a single polyolefin type, more preferably selected from polyethylene and polypropylene. This may be achieved either through the embodiment of step c) that involves an initial polyolefin sorting step prior to the colour-sorting step, or by sorting the mixed-colour sorted polyolefin recycling stream (CM) following the completion of all colour-sorting step. Preferably, this is achieved through the embodiment of step c) that involves an initial polyolefin sorting step prior to the colour-sorting step.

The sorting of step c) can be achieved through simple sorting algorithms, wherein the optical sensor(s) are programmed to assess which pieces should be selected or rejected based on simple binary considerations. Alternatively, more complex AI-based systems can be used to achieve a more precise sorting, in particular when sorting according to article form.

Whilst not wishing to be bound by theory, the inventors believe that the provision of a single-colour sorted polyolefin recycling stream in step c) is essential for obtaining a recycled product with improved properties. Not only is an improvement in the colour of the recycled product achieved, as may be expected, but also the presence of the key sorting step c) before any of the processing steps d) to m) allows for a more pure recycled product to be obtained. For example, the sorting according to colour in step c) may select only white polyolefin pieces, whilst all other colours, including colourless pieces, would be removed at this stage. Transparent pieces are often from plastic bottles, which are often made from PET. As such, it may be expected that the combined transparent pieces have a higher content of PET than for other colours, e.g. white. PET is prone to decomposition during, for example, the high temperature wash of step g), producing acetaldehyde, among other small organic molecules. Such small organic molecules have a negative effect on the odour of the resultant recycled product. By reducing the content of PET at this stage through a colour sorting, this problem can be reduced.

Furthermore, in different countries or regions, different packaging may have different typical colouring, such that, for example, green pieces would be more likely to contain a certain non-polyolefin or non-desired polyolefin. The advantages of the colour sorting of step c) can be different depending on which country or region the precursor mixed plastic recycling stream has been sourced from.

Additionally, certain coloured polymers contain specific pigments/dyes, which may individually lead to contamination of the recycled polyolefin product, such as if they contain metal pigments or are prone to decomposition during extrusion, thus forming malodorous compounds, or catalyse decomposition of the polyolefin during extrusion. Removal of coloured polymers known to contain these pigments/dyes would avoid these issues, resulting in improved quality of the recycled products.

The removal of certain problematic single-colour polyolefin recycling streams from the mixed-colour sorted polyolefin recycling stream (CM) helps to generate a high-quality product having a grey/black colour (for the same reasons given above for the single-coloured recycled products). In this regard, the removal of certain colours can improve the purity of the final grey/black recycled products in terms of polyolefin content, not just in terms of colour.

Whilst non-polyolefin and non-desired polyolefin flakes can be removed in step k), any sorting process has a limited efficiency, meaning that the purer the flakes are going into such a process, the purer the product of such a process will be. Even seemingly minor improvements in the purity of recycled products can be commercially very valuable, given the difficulty in obtaining pure products with state of the art processes.

Furthermore, removing such flakes after the washing steps e) and g) does not avoid the problem of cross-contamination between the flakes during the steps d) to j).

The presence of sorting step c) before the mechanical recycling steps of steps d) to m) furthermore means that the mechanical polyolefin recycling process according to the present invention enables the operator to obtain high quality recycled products, regardless of the quality of the feedstock material. It is well known that feedstock materials can greatly vary in quality, with regard to polyolefin content and foreign material contamination, which is largely dependent on the source of the feedstock material (i.e. the source of the precursor mixed plastic recycling stream (A)).

Step d) involves reducing the size of the pieces of the sorted polyolefin recycling stream (C or CM) to form a flaked polyolefin recycling stream (D).

The size-reduction of step d) may be carried out by any method known to the person skilled in the art. One suitable method involves milling the sorted polyolefin recycling stream (C or CM). An alternative method involves shredding the sorted polyolefin recycling stream (C or CM). It is particularly preferred that the size-reduction of step d) is a shredding step.

The shredding of step d) may be a wet-shredding process or a dry-shredding process. Preferably, the shredding of step d) is a wet shredding process, wherein the sorted polyolefin recycling stream (C or CM) is first contacted with an aqueous solution (W0) to provide a suspended sorted polyolefin recycling stream, which is thereafter is subjected to shredding.

The choice of aqueous solution (W0) is not particularly limited; however, it is preferred that the aqueous solution (W0) has a pH in the range from 8.0 to 14.0, more preferably in the range from 10.0 to 14.0, most preferably in the range from 12.0 to 14.0.

It is further preferred that the aqueous solution (W0) is at least part of the recycled aqueous washing solution removed during step h).

If the shredding of step d) is a wet shredding process, then the flaked polyolefin recycling stream (D) obtained therefrom is preferably mechanically dried before step e) begins. Suitable forms of mechanical drying include centrifugal drying and a dewatering press (filter or screw-press), each of which allows for the separation of liquids from solids.

The recycling of the aqueous washing solution used in step h) allows for improved process economy, wherein only one aqueous washing solution need be provided for use in the entire process. Furthermore, the aqueous washing solution used in step h) is by its nature an alkaline solution, assisting with the removal of foreign materials in either step d) or step e). It is important that cleanest washing solution (i.e. with the least foreign material present) is used in the last washing step, to ensure that the resultant washed polyolefin stream is as clean as possible. Finally, the multiple use of a single aqueous washing solution enables simplified waste stream treatment, avoiding the need for the treatment of multiple different waste streams containing different chemicals.

Step e) involves washing the flaked polyolefin recycling stream (D) with a first aqueous washing solution (W1) without the input of thermal energy, thereby generating a first suspended polyolefin recycling stream (E).

The person skilled in the art would be aware that known washing steps in the art may be either heated to achieve a high temperature wash or alternatively can be conducted at ambient conditions to achieve a low temperature wash. In the present process, step e) corresponds to such a low temperature wash.

The skilled person would also be aware that depending on the choice of the first aqueous washing solution (W1), the temperature during step d) may or may not truly match the ambient conditions, since the first aqueous washing solution (W1) may be hotter than ambient conditions due to being used, for example, in a previous high temperature wash. Even if the first aqueous washing solution (W1) has a temperature higher than ambient conditions, it would still be expected to be considerably lower that the temperature typically required for high temperature washing. What is critical to the definition of step e) is that no further thermal energy is expended to increase the temperature of the first aqueous washing solution (W1) during the washing of step e).

That said, is preferred that the temperature of the first aqueous washing solution (W1) during step e) is less than 70° C., more preferably less than 65° C., most preferably less than 60° C.

The choice of first aqueous washing solution (W1) is not particularly limited; however, it is preferred that the first aqueous washing solution (W1) has a pH in the range from 8.0 to 14.0, more preferably in the range from 10.0 to 14.0, most preferably in the range from 12.0 to 14.0.

The first aqueous washing solution (W1) may comprise a detergent in an amount in the range from 0.1 wt.-% to 1.0 wt.-%, relative to the total weight of the first aqueous washing solution (W1).

The detergent(s) may be commercially available detergent mixtures or may be composed in any way known to the person skilled in the art. Suitable detergents include TUBI-WASH SKP, TUBIWASH GFN, TUBIWASH EYE and TUBIWASH TOP, commercially available from CHT, KRONES colclean AD 1004, KRONES colclean AD 1002 and KRONES colclean AD 1008 from KIC KRONES, and P3-stabilon WT, P3 stabilon AL from ECOLAB Ltd.

It is further preferred that the first aqueous washing solution (W1) is at least part of the recycled aqueous washing solution removed during step h).

The advantages of reusing the recycled aqueous washing solution from step h) as the first aqueous washing solution are analogous to those discussed above with reference to the aqueous solution (W0).

The washing of step e) is a washing step, as opposed to a rinsing step as defined herein, and consequently typically lasts 5 minutes or longer, like 5 minutes to 4 hours.

The washing of step e) preferably lasts from 5 minutes to 2 hours, more preferably κ minutes to 1 hour, most preferably from 5 minutes to 30 minutes.

It is further preferred that the combination of the first aqueous washing solution (W1) and the flaked polyolefin recycling stream (D) in step g) is subjected to agitation through mechanical mixing, ultrasonic treatment, mechanical grinding or pump around loop, preferably the combination of the first aqueous washing solution (W1) and the flaked polyolefin recycling stream (D) in step g) is subjected to agitation through ultrasonic treatment. This agitation helps to expose the flakes in the recycling stream to fresh washing solution, thus ensuring that the process is not hindered through the buildup of contaminants in the immediate vicinity of the flake.

The person skilled in the art would be aware that multiple individual methods as provided above could be combined to improve the agitation, for example a combination of mechanical mixing and ultrasonic treatment.

Step f) involves removing at least part of the first aqueous washing solution (W1), preferably substantially all of the first aqueous washing solution (W1), from the first suspended polyolefin recycling stream (E) to obtain a first washed polyolefin recycling stream (F).

The person skilled in the art would understand that small amounts of foreign material that is either suspended or dissolved in the first suspended polyolefin recycling stream (E) would be removed with the first aqueous washing solution (W1); however, step f) does not involve the targeted removal of foreign material through the use of, for example, a so-called float/sink separation, wherein all foreign material that does not float on the surface of the solution (given that it would be expected that polyolefins having a density of less than 1.00 g/cm$^3$ would float) are removed with the solution.

Following the removal of at least part of the first aqueous washing solution (W1), the first washed polyolefin recycling stream (F) may be optionally rinsed with water to remove traces of the first aqueous washing solution (W1) remaining on the surface of the flakes of the first washed polyolefin recycling stream.

Whether rinsed or not, the first washed polyolefin recycling stream (F) may also be dried prior to step g); however, it is preferred that the first washed polyolefin recycling stream (F) is not dried prior to step g), since this would contribute to a lower process efficiency, in terms of energy efficiency and also step efficiency, whilst not contributing noticeably to the effect of the invention.

Step g) involves washing the first washed polyolefin recycling stream (F) with a second aqueous washing solution (W2) thereby generating a second suspended polyolefin recycling stream (G), wherein sufficient thermal energy is introduced to the second suspended polyolefin recycling stream (G) to provide a temperature in the range from 65 to 95° C. during the washing.

As discussed above, the person skilled in the art would be aware that known washing steps in the art may be either heated to achieve a high temperature wash or alternatively can be conducted at ambient conditions to achieve a low temperature wash. The washing of step g), in contrast to that of step e) is a high temperature wash, wherein thermal energy is introduced to provide a temperature of 65 to 95° C. during the washing.

The temperature of step g) is in the range from 65 to 95° C., more preferably in the range from 70 to 95° C., most preferably in the range from 75 to 95° C.

It is preferred that the second aqueous washing solution (W2) is an alkaline aqueous washing solution.

Preferably, the alkaline aqueous washing solution has a pH in the range from 9.0 to 14.0, more preferably in the range from 11.0 to 14.0, most preferably in the range from 12.0 to 14.0

Preferably, the alkaline aqueous washing solution is an aqueous solution of a base selected from the group consisting of calcium hydroxide, potassium hydroxide, magnesium hydroxide, lithium hydroxide, sodium bicarbonate, sodium hydroxide and mixtures thereof. Most preferably, the second aqueous washing solution (W2) is an aqueous solution of sodium hydroxide.

It is preferred that the amount of the base in the alkaline aqueous solution is in the range from 0.05 to 10 wt.-%, more preferably in the range from 0.10 to 7 wt.-%, most preferably in the range from 0.50 to 5 wt.-%, relative to the total weight of the alkaline aqueous solution In one particularly preferred embodiment, the second aqueous washing solution (W2) is a sodium hydroxide solution having a sodium hydroxide concentration in the range from 0.50 to 5.0 wt.-%, relative to the total weight of the second aqueous washing solution (W2).

The second aqueous washing solution (W2) may also comprise a detergent in an amount in the range from 0.1 wt.-% to 1.0 wt.-%, relative to the total weight of the second aqueous washing solution (W2).

The detergent(s) may be a commercially available detergent mixture or may be composed in any way known to the person skilled in the art. Suitable detergents include TUBI-WASH SKP, TUBIWASH GFN, TUBIWASH EYE and TUBIWASH TOP, commercially available from CHT, KRONES colclean AD 1004, KRONES colclean AD 1002 and KRONES colclean AD 1008 from KIC KRONES, and P3-stabilon WT, P3 stabilon AL from ECOLAB Ltd.

The washing of step g) is a washing step, as opposed to a rinsing step as defined herein, and consequently typically lasts 5 minutes or longer, like 5 minutes to 4 hours.

The washing of step g) preferably lasts from 5 minutes to 2 hours, more preferably 5 minutes to 1 hour, most preferably from 10 minutes to 45 minutes.

It is further preferred that the combination of the second aqueous washing solution (W2) and the first washed polyolefin recycling stream (F) in step g) is subjected to agitation through mechanical mixing, ultrasonic treatment, mechanical grinding or pump around loop, preferably the combination of the second aqueous washing solution (W2) and the first washed polyolefin recycling stream (F) in step g) is subjected to agitation through ultrasonic treatment. This agitation helps to expose the flakes in the recycling stream to fresh washing solution, thus ensuring that the process is not hindered through the buildup of contaminants in the immediate vicinity of the flake.

The person skilled in the art would be aware that multiple individual methods as provided above could be combined to improve the agitation, for example a combination of mechanical mixing and ultrasonic treatment.

Step h) involves removing the second aqueous washing solution (W2) and any material not floating on the surface of the first aqueous washing solution from the second suspended polyolefin recycling stream (G) to obtain a second washed polyolefin recycling stream (H).

In contrast to step f), wherein only minor amounts of foreign material suspended or dissolved in the washing solution are removed, step h) involves a so-called float/sink separation, whereby any and all material not floating on the surface of the washing solution is removed. This would be understood by the person skilled in the art to have the effect of removing any foreign material having a density of greater than 1.00 g/cm$^3$.

Without wishing to be bound by theory, it is believed that the inclusion of a float/sink separation step directly after the high temperature wash of step g) is extremely beneficial for removing as much foreign material as possible. Later steps in the process, such as aerating (step m) or drying (step i) may result in foreign material that has been removed from the polyolefin flakes re-adhering to the polyolefin flakes. This can result in either contamination of the final recycled product or a reduction in yield if, for example, label material adheres to any polyolefin flakes which causes these polyolefin flakes to be removed in later steps, e.g. the separation of step j) or the sorting of step k). As such, it is critical that this step occurs directly after step g).

It is particularly preferred that the aqueous washing solution removed during step h) is recycled for use as the first aqueous washing solution (W1) and the aqueous solution (W0), if present, as previously discussed.

If the aqueous washing solution removed during step h) is recycled as described above, it is preferred that the foreign material removed in the float/sink separation is filtered out of the solution before it is used as the first aqueous washing solution (W1) and/or the aqueous solution (W0).

Following the removal of the second aqueous washing solution (W2), the second washed polyolefin recycling stream (H) may be optionally rinsed with water to remove traces of the second aqueous washing solution (W2) remaining on the surface of the flakes of the first washed polyolefin recycling stream.

Step i) involves drying the second washed polyolefin recycling stream (H), thereby obtaining a dried polyolefin recycling stream (I).

The drying of step i) can be achieved through thermal drying or through a combination of mechanical and thermal drying. Suitable forms of mechanical drying include centrifugal drying and a dewatering press (filter or screw-press), each of which allows for the separation of liquids from solids.

Step j), if present, involves separating the dried polyolefin recycling stream (I) into a light fraction and a heavy fraction polyolefin recycling stream (J).

The light fraction typically contains labels and other non-polyolefin materials, whereas the polyolefin flakes are sorted into the heavy fraction polyolefin recycling stream (J).

The separation of step j) can be carried out by any known dry-state density separation technique known in the art. Suitable techniques include pneumatic classifying, wind sifters and zig zag cascade or air separators.

As would be understood by the person skilled in the art, the separation into a light fraction and heavy fraction by such methods would not solely be influenced by the density of the flakes, but more critically by the aerodynamic properties of the flakes (typically influenced by surface area to weight ratio). As such, flat labels are separated from the bulkier polyolefin flakes. The terms "light fraction" and "heavy fraction" are commonly used in the art and do not strictly refer to classification by density. The meaning of these terms in the present invention matches these generally understood terms in the art.

Between step j) and step k) an additional step may be present, wherein any pieces having a longest dimension of less than 2 mm (so-called fines) are removed. Any method known to the person skilled in the art may be employed, for example using screens or sieves.

Step k) involves further sorting the heavy fraction polyolefin recycling stream (J) or, in the case that step j) is absent, the dried polyolefin recycling stream (I) by means of one or more optical sorters sorting for one or more target polyolefins by any flakes containing material other than the one or more target polyolefins, yielding a purified polyolefin recycling stream (K).

Step k) uses at least a first optical sorter to remove any flake that contains material other than the one or more target polyolefins. The selection criteria in this optical sorter are that if any material other than the one or more target polyolefins is present in a given flake, that this flake will be separated from the stream, affording a purified polyolefin recycling stream.

If the one or more optical sorters sort for more than one target polyolefin, the resulting purified polyolefin recycling stream (K) may be a mixed-polyolefin purified recycling stream; however, it is preferred that these target polyolefins are separated into individual purified polyolefin recycling streams (K), each containing only a single target polyolefin.

Multiple optical sorters having the same sorting criteria may be arranged in series to improve the purity of the purified polyolefin recycling stream (K). Alternatively or additionally, multiple optical sorters may be arranged in series to sort for different criteria, for example colour and/or article form; however, it is preferred that each of the one or more optical sorters of step k) are sorting by polyolefin type as described above.

Any material removed from the heavy fraction polyolefin recycling stream (J) or, in the case that step j) is absent, the dried polyolefin recycling stream (I) by means of the one or more optical sorters may be discarded, or alternatively may be fed back into a previous step of the mechanical recycling process, either directly or after further sorting with an optical sorter to extract any discarded flakes containing the one or more target polyolefins.

Step l), if present, involves melt extruding, preferably pelletizing, the purified polyolefin recycling stream (K), preferably wherein additives (Ad) are added in the melt state, to form an extruded, preferably pelletized, recycled polyolefin product (L).

The extrusion of the recycled polyolefin product (L) in step l) is preferably undertaken using an extruder, more preferably a single-screw extruder.

In particular, it is preferred to use a conventional compounding or blending apparatus, e.g. a single-screw extruder, conical co-rotating twin-screw extruder or in multiple extruders (either single screw, twin screw, or a combination thereof) arranged in series. The recycled polyolefin product (L) recovered from the extruder are usually in the form of pellets, although if step m) is not present in the mechanical recycling process, then the recycled polyolefin product (L) may be in the form of an extruded article, such as a pipe. It is preferred that the recycled polyolefin product (L) is in the form of pellets.

Any additives (Ad) added during step l) are selected from additives known in the art, preferably selected from the group consisting of antioxidants, stabilizers, fillers, colorants, nucleating agents, antistatic agents, and mixtures thereof.

Such additives are generally commercially available and are described, for example, in "Plastic Additives Handbook", pages 871 to 873, 5th edition, 2001 of Hans Zweifel.

Step m), if present, involves aerating the recycled polyolefin product (L) or, in the case that step l) is absent, the purified polyolefin recycling stream (K) to remove volatile organic compounds, thereby generating an aerated recycled polyolefin product (M), being either an aerated extruded, preferably pelletized, recycled polyolefin product (M1) or aerated recycled polyolefin flakes (M2).

The aeration of step m) may be achieved, inter alia, through the use of air, inert gases or steam.

Preferably, the aeration of step m) is achieved by contacting the recycled polyolefin product (L) or, in the case that step l) is absent, the purified polyolefin recycling stream (K) with a gas being at least 60% by volume $N_2$ gas.

The temperature at which the aeration according to step m) takes place may be selected according to the identity of the polyolefin(s) present in the recycled polyolefin product (L) or the purified polyolefin recycling stream (K).

Suitable ranges for commonplace polyolefins are as follows:

HDPE—preferably in the range from 50 to 130° C., more preferably in the range from 90 to 122° C., most preferably in the range from 100 to 115° C.;

LDPE—preferably in the range from 50 to 155° C., more preferably in the range from 75 to 105° C.;

Polypropylene—preferably in the range from 50 to 155° C., more preferably in the range from 100 to 150° C.

It may also be beneficial to conduct the aeration according to step m) at reduced pressure, for example less than 500 mbar, more preferably less than 200 mbar, most preferably less than 100 mbar.

The aeration according to step m) ensures that the content of volatile organic compounds is minimised in the aerated recycled polyolefin product (M), avoiding any unpleasant odours that are typically associated with similar recycled polyolefin blends. These volatile organic compounds typically result from contamination of the polyolefin during the first consumer use, for example through contact with foods, skin care products or other toiletries, or simply through decomposition of the polyolefin into volatile oligomeric chains during processing steps.

Apparatus

In another aspect, the present invention is directed to a mechanical polyolefin recycling apparatus configured for carrying out the mechanical polyolefin recycling process as described above.

All preferable embodiments and fallback positions of the above-described mechanical polyolefin recycling process are applicable mutatis mutandis to the present mechanical polyolefin recycling apparatus.

The invention claimed is:

1. A mechanical polyolefin recycling process, comprising, in the given order:

a) providing a precursor mixed plastic recycling stream (A);

b) sieving the precursor mixed plastic recycling stream (A) to create a sieved mixed plastic recycling stream (B) having only articles with a longest dimension in the range from 30 to 400 mm;

c) sorting the sieved mixed plastic recycling stream (B) by means of one or more optical sorters wherein the sieved mixed plastic recycling stream (B) is at least sorted by colour and optionally also by polyolefin type and/or article form, thereby generating one or more single-colour sorted polyolefin recycling stream(s) (C) and a mixed-colour sorted polyolefin recycling stream (CM), wherein each of the one or more single-colour sorted polyolefin recycling stream(s) (C) and the mixed-colour sorted polyolefin recycling stream (CM) are subjected separately to steps d) and beyond;

d) shredding the sorted polyolefin recycling stream (C or CM) to form a flaked polyolefin recycling stream (D);

e) washing the flaked polyolefin recycling stream (D) with a first aqueous washing solution (W1) without the input of thermal energy, thereby generating a first suspended polyolefin recycling stream (E);

f) removing at least part of the first aqueous washing solution (W1) from the first suspended polyolefin recycling stream (E) to obtain a first washed polyolefin recycling stream (F);

g) washing the first washed polyolefin recycling stream (F) with a second aqueous washing solution (W2) thereby generating a second suspended polyolefin recycling stream (G), wherein sufficient thermal energy is introduced to the second suspended polyolefin recycling stream (G) to provide a temperature in the range from 65 to 95° C. during the washing;

h) removing the second aqueous washing solution (W2) and any material not floating on the surface of the second aqueous washing solution from the second suspended polyolefin recycling stream (G) to obtain a second washed polyolefin recycling stream (H);

i) drying the second washed polyolefin recycling stream (H), thereby obtaining a dried polyolefin recycling stream (I);

j) optionally separating the dried polyolefin recycling stream (I) into a light fraction and a heavy fraction polyolefin recycling stream (J);

k) further sorting the heavy fraction polyolefin recycling stream (J) or, in the case that step j) is absent, the dried polyolefin recycling stream (I) by means of one or more optical sorters sorting for one or more target polyolefins by removing any flakes containing material other than the one or more target polyolefins, yielding a purified polyolefin recycling stream (K);

l) Optionally melt extruding, preferably pelletizing, the purified polyolefin recycling stream (K) to form an extruded recycled polyolefin product (L); and m) optionally aerating the recycled polyolefin product (L) or, in the case that step l) is absent, the purified polyolefin recycling stream (K) to remove volatile organic compounds, thereby generating an aerated recycled polyolefin product (M), being either an aerated extruded recycled polyolefin product (M1) or aerated recycled polyolefin flakes (M2), wherein the order of steps l) and m) can be interchanged, such that the purified polyolefin recycling stream (K) is first aerated to form aerated recycled polyolefin flakes (M2) that are subsequently extruded to form an extruded aerated recycled polyolefin product (M3).

2. The process according to any claim 1, wherein the optical sorters of step c) sort via a method selected from the group consisting of camera systems (operating in the visible range of the EM-spectrum), visible reflectance spectroscopy, near-IR spectroscopic analysis, mid-IR spectroscopic analysis, high-speed laser spectroscopic analysis, Raman spectroscopic analysis, and Fourier-transform infrared (FT IR) spectroscopic analysis.

3. The mechanical polyolefin recycling process according to claim 1, wherein the shredding of step d) is a wet shredding process, wherein the sorted polyolefin recycling stream (C) is first contacted with an aqueous solution (W0) to provide a suspended sorted polyolefin recycling stream, which is thereafter subjected to shredding.

4. The mechanical polyolefin recycling process according to claim 1, wherein the second aqueous washing solution (W2) is an alkaline aqueous washing solution.

5. The mechanical polyolefin recycling process according to claim 4, wherein the alkaline aqueous solution has a pH in the range from 9.0 to 14.0.

6. The mechanical polyolefin recycling process according to claim 4, wherein the amount of the base in the alkaline aqueous solution is in the range from 0.05 to 10 wt.-%, relative to the total weight of the alkaline aqueous solution.

7. The mechanical polyolefin recycling process according to claim 1, wherein at least part of the second aqueous washing solution (W2) removed in step h) is recycled for use as the first aqueous washing solution (W1) and/or the aqueous solution (W0), if present.

8. The mechanical polyolefin recycling process according to claim 1, wherein the first aqueous washing solution (W1) and/or the aqueous solution (W0), if present have a pH in the range from 8.0 to 14.0.

9. The process according to claim 1, wherein the precursor mixed plastic recycling stream (A) originates from post-consumer waste, post-industrial waste, or a combination thereof.

10. The process according to claim 1, wherein one of the one or more single-colour sorted polyolefin recycling stream (s) (C1) is either a single-colour sorted polyethylene recycling stream or a single-colour sorted polypropylene recycling stream.

11. The process according to claim 1, wherein the sorting of step c) sorts the filtered mixed plastic recycling stream (B) into at least a first single-colour sorted polyolefin recycling stream (C1) containing a first target polyolefin (PO1), a second single-colour sorted polyolefin recycling stream (C2) containing a second target polyolefin (PO2) and a mixed-colour sorted polyolefin recycling stream (CM), wherein the first target polyolefin (PO1) and the second polyolefin (PO2) differ in at least one property selected from colour, polyolefin type and article form, wherein the first single-colour sorted polyolefin recycling stream (C1), the second single-colour sorted polyolefin recycling stream (C2), and the mixed-colour sorted polyolefin recycling stream (CM) are individually subjected to steps d) and beyond.

12. The mechanical polyolefin recycling process according to claim 11, wherein the sorting of step c) comprises:

c1) sorting the filtered polyolefin recycling stream (B) using a first optical sorter to obtain a fraction (C4) that contains two target polyolefins (PO1 and PO2) and a mixed-colour recycling stream (C5);

c2) sorting the fraction containing two target polyolefins (C4) using a second optical sorter to obtain a first target fraction (C6) containing the first target polyolefin (PO1) and a second target fraction (C7) containing the second target polyolefin (PO2);

c3) further purifying the first target fraction (C6) and the second target fraction (C7) using a third optical sorter, thereby removing any articles not containing the first target polyolefin (PO1) from the first target fraction (C6) and any articles not containing the second target polyolefin (PO2) from the second target fraction (C7), thereby obtaining a first single-colour sorted polyolefin recycling stream (C1) and a second single-colour sorted polyolefin recycling stream (C2), which are individually subjected to steps d) and beyond, and a further mixed-colour recycling stream (C8);

c4) feeding mixed-colour recycling stream (C5) and further mixed-colour recycling stream (C8) into a fourth optical sorter to remove any articles containing the first target polyolefin (PO1) or the second target polyolefin (PO2), thereby generating a reclaimed fraction (C9) and a mixed-colour polyolefin recycling stream (C3); and c5) feeding the reclaimed fraction (C9) back into the first optical sorter during step c1), wherein the mixed-colour polyolefin recycling stream (C3) is either subjected to steps d) and beyond as the mixed-colour sorted polyolefin recycling stream (CM) or subjected to a further iteration of step c), thereby separating the mixed-colour polyolefin recycling stream (C3) into a further first single-colour sorted polyolefin recycling stream (C1), a further second single-colour sorted polyolefin recycling stream (C2), and a further mixed-colour polyolefin recycling stream (C3).

13. The mechanical polyolefin recycling process according to claim 11, wherein the first target polyolefin (PO1) and the second target polyolefin (PO2) are the same colour but contain different polyolefin types or wherein the first target polyolefin (PO1) and the second target polyolefin (PO2) contain the same polyolefin type but are different colours.

14. The mechanical polyolefin recycling process according to claim 13, wherein the first target polyolefin (PO1) is a polypropylene having a first desired colour and the second target polyolefin (PO2) is a polypropylene having a second desired colour different to the first desired colour, or wherein the first target polyolefin (PO1) is a polyethylene having a first desired colour and the second target polyolefin (PO2) is a polyethylene having a second desired colour different to the first desired colour.

15. The mechanical polyolefin recycling process according to claim 1, wherein the sorting of step c) involves first sorting the sieved mixed plastic recycling stream (B) by polyolefin type, thereby generating a mixed-colour single polyolefin recycling stream (CS), which is subsequently sorted by colour to generate the one or more single-colour sorted polyolefin recycling stream(s) (C) and a mixed-colour sorted polyolefin recycling stream (CM), wherein each single-colour sorted polyolefin recycling stream (C) and the mixed-colour sorted polyolefin recycling stream (CM) contain the same polyolefin.

16. The mechanical polyolefin recycling process according to claim 1, wherein the melt extruding of step 1) is a pelletizing step, the extruded recycled polyolefin product (L) is a pelletized recycled polyolefin product (L), the aerated extruded recycled polyolefin product (M1) is an aerated pelletized recycled polyolefin product (M1), or wherein the wherein the order of steps 1) and m) are interchanged, the melt extruding of step 1) is a pelletizing step, and the extruded aerated recycled polyolefin product (M3) is a pelletized aerated recycled polyolefin product (M3).

17. The mechanical polyolefin recycling process according to claim 1, wherein additives (Ad) are added in the melt state during the melt extruding of step 1).

18. The mechanical polyolefin recycling process according to claim 4, wherein the second aqueous washing solution (W2) is an aqueous solution of a base selected from the group consisting of calcium hydroxide, potassium hydroxide, magnesium hydroxide, lithium hydroxide, sodium bicarbonate, sodium hydroxide and mixtures thereof.

19. The mechanical polyolefin recycling process according to claim 15, wherein the same polyolefin is selected from polyethylene and polypropylene.

\* \* \* \* \*